May 31, 1960     I. J. FILLER     2,938,474
DOUGH-PROCESSING MACHINE
Filed April 2, 1956     3 Sheets-Sheet 3
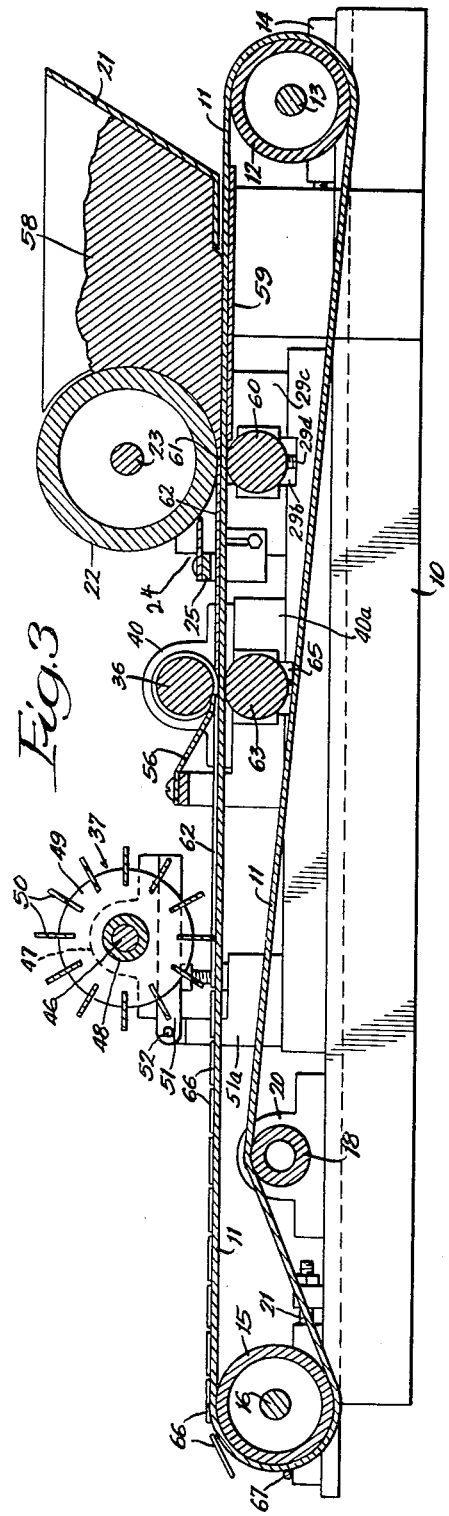
INVENTOR:
Isadore J. Filler,
BY
Dawson, Tilton & Graham,
ATTORNEYS.

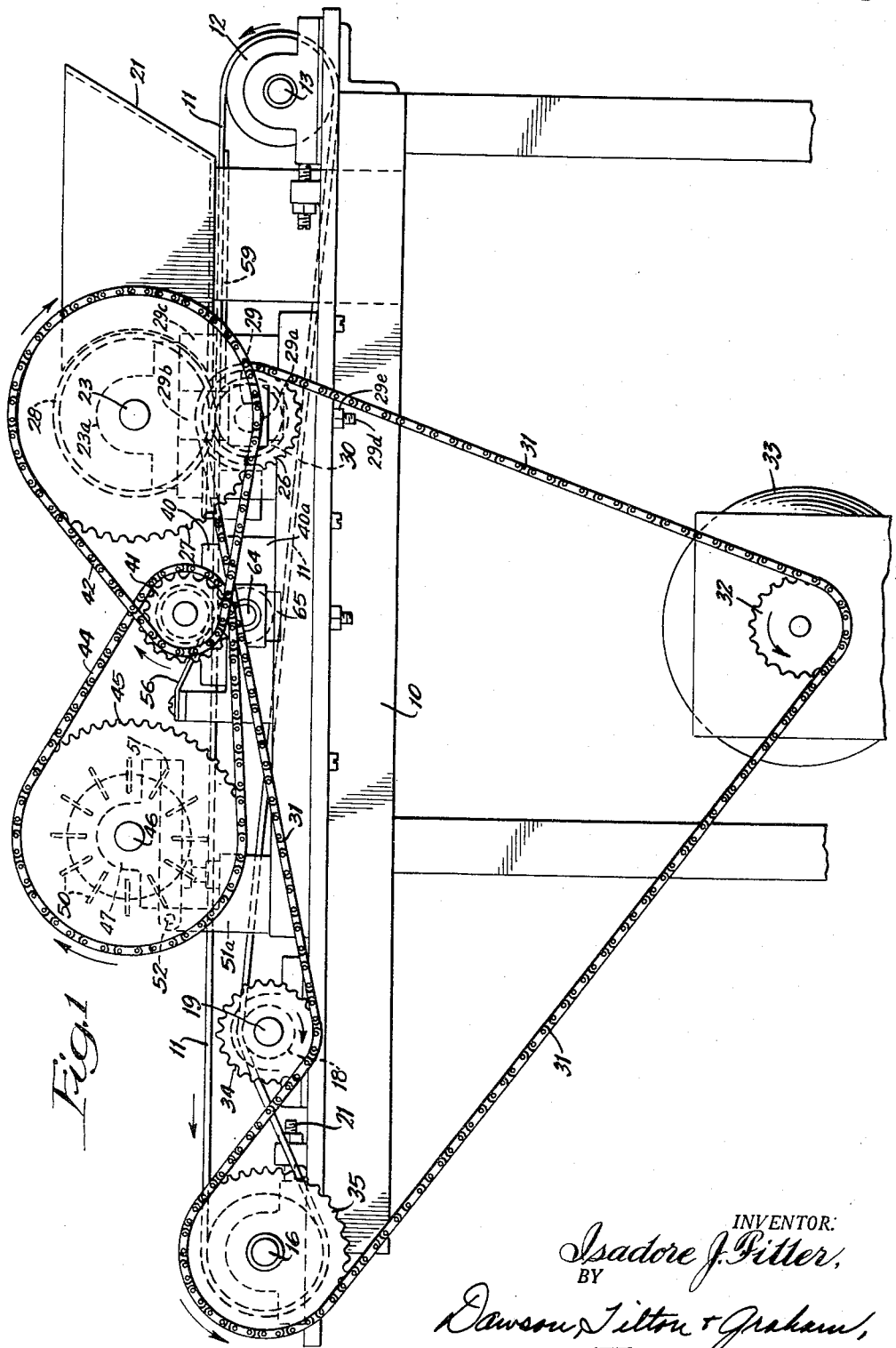

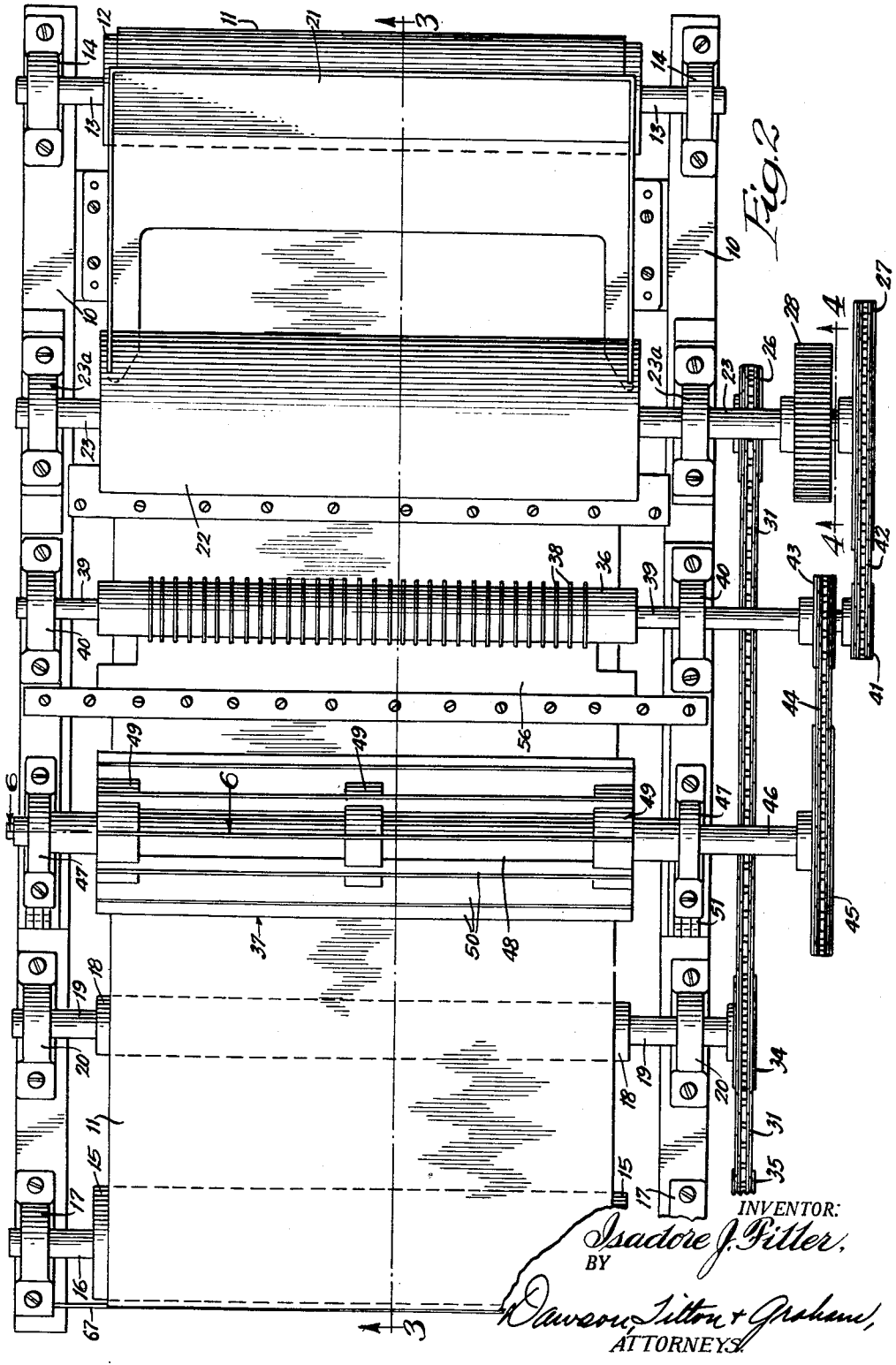

United States Patent Office 2,938,474
Patented May 31, 1960

2,938,474

DOUGH-PROCESSING MACHINE

Isadore J. Filler, 35 Lombardy Way, Atlanta, Ga.

Filed Apr. 2, 1956, Ser. No. 575,655

5 Claims. (Cl. 107—69)

This invention relates to a dough-processing machine, and is particularly useful in connection with a corn dough-forming and cutting machine.

An object of the present invention is to provide a machine of compact structure effective for forming dough into sheets and severance longitudinally and transversely into sections for the automatic discharge of the severed sections for cooking within a liquid cooking medium or other cooking apparatus. A further object is to provide in such apparatus mechanism which cooperates with a continuous belt for the transverse severing of the dough sheet, the severing being effective across the entire belt and irrespective of irregularities in the belt. A still further object is to provide a means whereby the formed sheet may, after the sheet-forming step, be lifted and then dropped upon the conveyor to render the sheet more readily removable after the severing and sectioning operations. Yet a further object is to provide a machine for the feeding of dough along a horizontal plane and compressing the same to form a continuous sheet which may then be operated upon in separate cutting operations to form sectioned portions which are spaced apart for ready and separate removal. A still further object is to provide in such a structure a rigid cutting roller of few parts, while at the same time mounting the cutter in such a manner as to render it effective for the transverse cutting of the dough sheet irrespective of irregularities in the supporting belt. Yet another object is to provide means for preventing the clogging of the longitudinal slitters while also providing means for removal of the sections in separate portions. A still further object is to provide a machine for the transfer of a continuous sheet and means for sectioning the same so as to produce a more uniform product and one which is removed in separate sections with a minimum of fragmentation. Other specific objects and advantages will appear as the specification proceeds.

The invention is shown, in an illustrative embodiment, by the accompanying drawings, in which:

Figure 1 is a side view in elevation of apparatus embodying my invention and in which my improved process may be practiced; Fig. 2, a top plan view; Fig. 3, a sectional view, the section being taken as indicated at line 3—3 of Fig. 2; Fig. 4, a sectional detail view, the section being taken as indicated at line 4—4 of Fig. 2; Fig. 5, a fragmentary perspective view on an enlarged scale of the finger-guard employed with the longitudinal slitter structure; and Fig. 6, a sectional detail view, on an enlarged scale, the section being taken as indicated at line 6—6 of Fig. 2.

In the illustration given, I provide a frame or base 10, which may be of any suitable construction, and upon which are mounted a plurality of bearings and shafts which will be described in greater detail hereafter.

Upon the frame there is supported a continuous belt 11 adapted to convey dough thereon, the belt 11 being carried upon a roller 12 mounted on shaft 13 at one end of the frame, the shaft 13 being supported within the bearings 14, as shown best in Fig. 2. The belt 11 is supported at the other end of the frame 10 upon a roller 15 carried by shaft 16, the shaft 16 being supported within the bearings 17. The lower run of the belt 11 engages a roller 18 mounted upon shaft 19 and supported within bearings 20. Adjustment means 21 may be provided for moving the bearings 17 carrying the shaft 16 so as to tighten the belt 11.

Over the belt 11 at the rear end thereof is mounted a hopper 21 having a partially open bottom communicating with the belt 11 and having an open front side closed by a forming roller 22. The forming roller 22 is carried by a shaft 23, and the ends of the shaft are mounted in bearings 23a. Adjacent the forward side of the roller 22 is mounted a scraper blade 24 having an edge engaging the roller 22, the blade being supported upon a support 25 extending across and above belt 11 and secured to frame 10, as shown best in Fig. 3. The shaft 23 has on one side an extended portion provided with a sprocket 28 and a driven gear 27.

Immediately below the forming roller 22 and the belt 11 is a second shaft 29 mounted in adjustable bearings 29a carried by frame 10 and equipped with a sprocket 26 and with a pinion gear 30, the pinion gear 30 meshing with gear 28 mounted upon shaft 23, whereby rotation of shaft 29 produces a simultaneous rotation of shaft 23. Shaft 29 is movable vertically into different relative positions with respect to shaft 23 by shifting bearings 29a (seen in Fig. 1) vertically within slots 29b in the bearing pedestals 29c supporting bearings 23a above frame 10. The precise vertical position of bearings 29a in slots 29b is fixed by the position of setscrews 29d locked in placed by lock-nuts 29e. The sprocket 26 is adapted to be rotated by a chain 31 engaging the drive sprocket 32 of the motor 33. The chain 31 also engages a sprocket 34 mounted on shaft 19 and a sprocket 35 mounted upon one end of the shaft 16 at the discharge end of the apparatus. In combination with the forming roller 22 which is effective in flattening the dough to form a sheet which is conveyed forwardly by the belt 11, I provide a longitudinal cutter or slitter 36 and a transverse cutter 37, and I also provide drive means hereinafter described whereby the two cutters are operated through the rotation of shaft 23.

Referring first to the longitudinal cutter 36, I provide the roller of this cutter with a series of annular knives 38, which are spaced apart so as to slit the sheet of dough in a longitudinal direction. The slitter is carried upon a shaft 39 having its ends mounted in the bearings 40 mounted in frame 10. The bearings 40 are carried by pedestals 40a secured to frame 10. The annular knives 38 can be rigidly secured in annular grooves (not shown) in the cylindrical surface of the roller of the longitudinal cutter 36. The shaft 39 is extended at one end to carry a sprocket 41, and a chain 42 connects the sprocket 41 to the enlarged sprocket 27 of shaft 23. The shaft 39 carries also a second sprocket 43 which is connected by a chain 44 to a large sprocket 45 mounted on the transverse cutter shaft 46.

The transverse cutter shaft 46 is mounted upon bearings 47, hereinafter described, and the shaft carries a cylindrical tube 48 having spaced collars 49 slotted to receive axially-extending cutter blades 50.

The bearings 47 for the transverse cutter shaft 46 each comprise a pillow block secured upon a pivoted support 51 which allows the lowermost cutter blade to lie against the belt 11 therebelow. The weight of the bearings, plus the weight of the cutter blades, thus urges the lowermost blade toward and against the belt 11. The eccentric or pivotal mountings of the supports 51 of the bearings for the transverse cutter shaft 46 are shown best in Figs. 1 and 3, each pivotal mounting comprising a pivot pin 52 on one end of its respective support 51 engaging an aperture formed in the upper ends of support pedestals 51a.

Any suitable means for securing the shaft 46 to the tubular member 48 may be employed. In the specific illustration given in Fig. 6, the shaft 46 at one end is slotted longitudinally to receive the tapered end of pin 53, and the pin 53 threadedly engages at 54 a nut 55 secured in one of the bearings 47, whereby rotation of the spreader shaft or pin 53 to force the tapered end of the pin 53 inwardly causes the slotted end of shaft 46 to expand into tight engagement with the tube 48.

In the longitudinal slitting operation, I find that there is a tendency for dough portions to be picked up by the circular knives 38 and to provide an obstruction which interferes with the even cutting or slitting of the sheet, and to avoid this, I provide a transversely-extending web member 56 having a slotted rear edge providing guard-fingers 57. The slots between the fingers receive the cutting edges of circular knives 38 and restrain particles of dough from passing upwardly and lodging between the cutter edges.

To support the heavy body of meal 58 within the hopper 21, I provide a plate 59 which extends below the hopper and forward to a point adjacent the bottom of the forming roller 22. To support the belt 11 just below the forming roller 22 and so as to accurately determine the thickness of the dough sheet formed, I provide shaft 29 with a roller 60, and the shaft 29 is supported upon vertically-adjustable bearings 29a. By raising and lowering the roller 60, the space 61 between the belt 11 and the forming roller 22 can be adjusted so as to provide a dough sheet 62 of the desired thickness. Shaft 29 is provided with a pinion 30 which engages the gear 28 fixed upon the upper shaft 23, as has already been described, and as the shaft 29 rotates, the roller 60 is turned in the direction of travel of the upper forming roller 22.

I provide also another roller 63 having end shafts 64 mounted upon vertically-adjustable bearings 65 whose construction is similar to bearings 29a so as to support the belt 11 just below the longitudinal cutter 36, as shown best in Fig. 3.

It will be noted that supporting rollers are provided for the belt below the forming roller 22 and below the longitudinal slitter 36, but below the transverse cutter 37 there is provided no support for the belt. By employing a pivotal bearing support for the transverse cutter 37 and by failing to support the belt below this cutter, I find that in spite of the irregularities of the belt, which irregularities cannot be avoided, effective transverse cutting of the sheet is brought about, while at the same time there is brought about a slight spacing of the transverse slitted sections.

I prefer to operate the transverse slitter 37 at a slightly different speed from the lineal speed of the belt 11, and preferably at a slightly faster speed, so that as the transverse cutter blades 30 sever the sheet 62, they move the sectioned portions or wafers 66 slightly ahead of each other to provide separated segments which readily fall off of the belt 11 at the discharge end thereof. Any suitable means for insuring the ready removal of the sections 66 may be employed. In the illustration given, I provide a wire 67 which is stretched across the forward end of the belt 11 so as to separate any segments or wafer portions 66 from the belt. The wire 67 may extend transversely of the belt in a horizontal plane, but I prefer to have it extend in a diagonal position across the forward loop of the belt so that the wafers 66 are guided gently from the belt as they are discharged. It will be understood that the discharged wafers fall into a cooking vat (not shown), containing a cooking medium such as vegetable oils, fats, and the like, for the cooking of the dough, and for this purpose the removal of the sectioned portions 66 intact and without fragmentation is of the utmost importance. It will be understood that the discharged sections 66 may fall into any sort of cooking device or onto a conveyor or any other desired structure.

*Operation*

In the operation of the process and apparatus, meal 56 is introduced into the hopper 21 and the motor 33 is started into operation so as to drive the various parts which have been described. The adjustment roller 60 is supported at an elevation for forming a dough sheet 62 of the desired thickness, and the forming roller 22 carries the dough material which may consist of moistened cornmeal, etc., and the sheet 62 is advanced upon the belt 11. One of the problems involved in the carrying forward of such dough is that the dough tends to cling to the belt 11, and when the dough is finally discharged after being sectioned, fragmentation of the sectioned portions occurs, thus involving a loss of product and a less uniform product. I have discovered that by employing the forming roller 22 as described, in conjunction with a scraper blade 24, with dough of this character there is a tendency for the roller 22 to pick up the dough and to lift it vertically and away from the belt 11. The scraper blade 24, supported as it is, slightly above the belt 11, is effective in stripping the sheet thus lifted upwardly and allowing it to fall back upon the belt 11. Thus the lifting of the sheet at this point and the dropping of the same upon the belt tends to break the tenacious hold of the belt 11 upon the sheet and thereafter a more ready separation of the sectioned sheet portions can be effected without fragmentation.

The sheet, as it is advanced by the belt 11, is longitudinally slitted by the slitter 36 and the rotary knives 38 thereof, while the guard-fingers 57 of the member 56 prevent the space between the blades from being obstructed by dough portions. The longitudinally-slitted sheet 62 is advanced upon the broad belt 11 below the pivotally-mounted transverse slitter 37 which is rotated at a different speed from the lineal speed of the belt 11 and preferably at a slightly faster speed. The blades 50 strike the sheet 62, as illustrated best in Fig. 3, and move the sectioned portions slightly forwardly to space the same so that the sections fall readily from the forward end of the belt, as illustrated in Fig. 3. The belt is cleaned from adhering material by the transverse wire 67, and the wire further insures the removal of the sectioned portions 66. The wire 67 can be conveniently secured to the opposite sides of frame 10 through suitable openings provided in the pillow blocks making up bearings 17.

In the operation described, the dough is compressed to form a continuous sheet on the belt, and the sheet is successively formed into longitudinal and transverse sections while at the same time slightly spacing apart the transverse sections, as described, and finally the sections are removed in a positive manner by the stripper wire 67 which also prevents the carrying back of dough or particles which would impair the efficiency of the belt.

While, in the foregoing specification, I have set forth a specific structure in considerable detail for the purpose of illustrating my improved method and apparatus, such details of structure and method may be varied widely by those skilled in the art without departing from the spirit of my invention.

I claim:

1. In a dough-forming and cutting machine, a frame, a hopper having an open bottom and overlying said frame, a continuous belt and means for supporting the same for travel on said frame, said hopper also being over said belt, whereby dough is supplied thereto from the open hopper bottom and said hopper also having an open forward side, a forming roller closing the forward side of said hopper and spaced from said belt for forming a dough sheet thereon, a vertically-adjustable roller supported on said frame below said forming roller and said belt, a supporting plate on said frame extending below the belt and along the portion thereof between the forming roller and the rear side of said hopper, whereby said forming roller, said vertically-adjustable roller, said belt and said plate cooperate to form a thin sheet of dough, means for cutting said dough sheet longitudinally, a cutter shaft extending transversely of said belt provided with spaced cutter blades extending transversely of said belt, bearings for said shaft pivotally supported on one end upon said frame, whereby said transverse blades are caused to rest under their own weight upon said belt, and means for driving said belt and rotating said rollers and shaft.

2. In a dough-forming and cutting machine, a frame, a hopper having an open bottom and overlying said frame, a continuous belt and means for supporting the same for travel on said frame, said hopper also being over said belt, whereby dough is supplied thereto from the open hopper bottom and said hopper also having an open forward side, a forming roller closing the forward side of said hopper and spaced from said belt for forming a dough sheet thereon, means for cutting said dough sheet longitudinally, a cutter shaft extending transversely of said belt provided with spaced cutter blades extending transversely of said belt, bearings for said shaft pivotally supported at one end upon said frame, said belt being provided with supporting means beneath said forming roller and said longitudinal cutting means, said belt also being supported at each end by a roller, said supporting means including spaced supporting members terminating beneath said forming roller and longitudinal cutting means, whereby the belt is unsupported below said cutter shaft and between said longitudinal cutting means and the forward end of said belt, the said blades resting under their own weight upon said belt, and means for driving said belt and rotating said rollers and shaft.

3. The structure of claim 2, in which said driving means is operative to drive said cutter shaft at a faster linear speed than said belt.

4. In apparatus for producing dough segments, a frame having an endless belt movably supported thereon, a hopper supported above said belt adjacent the rearward end thereof, said hopper having its forward side and bottom open, a forming roll rotatably supported on said frame above said belt and closing said forward side, a vertically-adjustable roll rotatably mounted on said frame below said belt, plate means on said frame adjacent said vertically-adjustable roll, said rolls and said plate means defining a sheet-forming way for dough deposited on said belt from said hopper with said plate means extending forwardly to a point adjacent the bottom of said forming roll for supporting the portion of the belt underlying the open bottom of the hopper, a scraper blade on said frame operative to strip dough adhering to said forming roll, a slitting roll rotatably mounted on said frame above said belt and spaced forwardly of said forming roll for slitting the dough sheet longitudinally, anvil roll means rotatably supported on said frame below said belt and aligned with said slitting roll, a cutting roll rotatably supported on said frame above said belt and spaced forwardly of said slitting roll for severing the dough sheet transversely, a wire extending across and above said belt at the forward end thereof, and means for driving said rolls.

5. In combination with a frame and a roller-supported belt thereon, an open-bottomed hopper over said belt to deposit dough thereon and having an open forward end, a forming roller closing the forward end of the hopper, a vertically-adjustable roller mounted on said frame below said forming roller and said belt, means for rotating said adjustable roller, plate means on said frame below said belt and hopper and extending forwardly to a point adjacent the bottom of said forming roller for supporting the portion of the belt underlying the open bottom of the hopper, means for rotating the forming roller to form a dough sheet on said belt and to pick up the dough sheet thereon, a scraper blade engaging the forward side of said forming roller adjacent the belt to separate the sheet from said forming roller and drop the same upon said belt, and means for severing said sheet longitudinally and transversely.

References Cited in the file of this patent

UNITED STATES PATENTS

| | | |
|---|---|---|
| 319,991 | Morhard | June 16, 1885 |
| 524,022 | Harton | Aug. 7, 1894 |
| 680,051 | Luetke | Aug. 6, 1901 |
| 691,499 | Snedden | Jan. 21, 1902 |
| 1,007,721 | Meyer | Nov. 7, 1911 |
| 1,945,755 | Scruggs | Feb. 6, 1934 |
| 2,232,832 | Walborn | Feb. 25, 1941 |
| 2,666,399 | Pereyra | Jan. 19, 1954 |
| 2,682,839 | Filler | July 6, 1954 |
| 2,687,699 | Oakes | Aug. 31, 1954 |
| 2,704,520 | Rose et al. | Mar. 2, 1955 |
| 2,756,459 | Kellner | July 31, 1956 |